(12) United States Patent
Meyer (10) Patent No.: US 6,996,829 B2
(45) Date of Patent: Feb. 7, 2006

(54) HANDLING CALLOUTS MADE BY A MULTI-THREADED VIRTUAL MACHINE TO A SINGLE THREADED ENVIRONMENT

(75) Inventor: Scott Meyer, Pacifica, CA (US)

(73) Assignee: Oracle International Corporation, Redwood Shores, CA (US)

( * ) Notice: Subject to any disclaimer, the term of this patent is extended or adjusted under 35 U.S.C. 154(b) by 770 days.

(21) Appl. No.: 09/730,803

(22) Filed: Dec. 7, 2000

(65) Prior Publication Data

US 2002/0073135 A1 Jun. 13, 2002

Related U.S. Application Data

(60) Provisional application No. 60/185,135, filed on Feb. 25, 2000.

(51) Int. Cl.
*G06F 9/46* (2006.01)

(52) U.S. Cl. .................... 719/328; 718/1; 718/107

(58) Field of Classification Search ............. 718/102, 718/107, 1; 709/217; 719/316, 328; 717/148, 717/166; 707/103 Y
See application file for complete search history.

(56) References Cited

U.S. PATENT DOCUMENTS 6,125,382 A * 9/2000 Brobst et al. ............... 718/102
6,202,208 B1 * 3/2001 Holiday, Jr. ................ 717/166
6,260,077 B1 * 7/2001 Rangarajan et al. ........ 719/328
6,275,843 B1 * 8/2001 Chorn ........................ 718/101
6,282,702 B1 * 8/2001 Ungar ........................ 717/148
6,401,109 B1 * 6/2002 Heiney et al. ................ 718/1
6,415,334 B1 * 7/2002 Kanamori ................... 719/316
6,510,437 B1 * 1/2003 Bak et al. ............... 707/103 Y
6,560,626 B1 * 5/2003 Hogle et al. ................ 718/102

OTHER PUBLICATIONS

Zalzala et al. "MTGP: a multithreaded Java tool for generic programming applications" 1999 IEEE, pp. 904-912.*
Helaihel et al. "JMTP: an architecture for exploiting concurrency in embedded Java applications with real-time considerations" 1999 IEEE, pp. 551-557.*

* cited by examiner

*Primary Examiner*—Meng-Al T. An
*Assistant Examiner*—Van Hoa Nguyen
(74) *Attorney, Agent, or Firm*—Hickman Palermo Truong & Becker LLP (57) ABSTRACT

Techniques are provided for making call outs from a multi-threaded virtual machine to a server running in a master native thread. When a virtual machine thread that is not running in the master native thread (a "non-master VM thread") encounters code that requires a call to be made to a server routine, the non-master VM thread transfers control to the master native thread for making the call. The master native thread is then used to make the call out to the specified server routine. If the call returns without an error, then the non-master VM thread switches back to using a non-master native thread.

11 Claims, 5 Drawing Sheets

HANDLING CALLOUTS MADE BY A MULTI-THREADED VIRTUAL MACHINE TO A SINGLE THREADED ENVIRONMENT

RELATED APPLICATIONS

The present application claims the benefit of the following U.S. Provisional Patent Application, the contents of which are incorporated by reference in its entirety:

U.S. Provisional Patent Application Ser. No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer.

The present application is related to the following commonly-assigned, co-pending U.S. patent applications, the contents of all of which are incorporated by reference in their entirety:

U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al. now U.S. Pat. No. 6,457,019;

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999by Harlan Sexton et al. now U.S. Pat. No. 6,499,095;

U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al.;

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al. now U.S. Pat. No. 6,434,685;

U.S. patent application Ser. No. 09/320,578 entitled METHOD AND ARTICLE FOR ACCESSING SLOTS OF PAGED OBJECTS, filed on May 27, 1999 by Harlan Sexton et al. now U.S. Pat. No. 6,401,185;

U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al. now U.S. Pat. No. 6,564,223;

U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al. now U. S. Pat. No. 6,711,657;

U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al. now U. S. Pat. No. 6,604,182;

U.S. patent application Ser. No. 09/512,621 entitled SYSTEM AND METHODOLOGY FOR SUPPORTING A PLATFORM INDEPENDENT OBJECT FORMAT FOR A RUN-TIME ENVIRONMENT, filed on Feb. 25, 2000 by Harlan Sexton et al.

U.S. patent application Ser. No. 09/512,618 entitled METHOD AND APPARATUS FOR MANAGING SHARED MEMORY IN A RUN-TIME ENVIRONMENT, filed on Feb. 25, 2000 by Harlan Sexton et al., now U.S. Pat. No. 6,829,761; and U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al., now U.S. Pat. No. 6,854,114.

FIELD OF THE INVENTION

The present invention relates to computer systems and, more specifically, to handling callouts made by a multi-threaded virtual machine to a single threaded environment.

BACKGROUND OF THE INVENTION

A virtual machine is software that acts as an interface between a computer program that has been compiled into instructions understood by the virtual machine and a microprocessor (or "hardware platform") that actually performs the program's instructions. Once a virtual machine has been provided for a platform, any program compiled for that virtual machine can run on that platform.

One popular virtual machine is known as the Java virtual machine (VM). The Java virtual machine specification defines an abstract rather than a real "machine" (or processor) and specifies an instruction set, a set of registers, a stack, a "garbage-collected heap," and a method area. The real implementation of this abstract or logically defined processor can be in other code that is recognized by the real processor or be built into the microchip processor itself.

The output of "compiling" a Java source program (a set of Java language statements) is called bytecode. A Java virtual machine can either interpret the bytecode one instruction at a time (mapping it to a real microprocessor instruction) or the bytecode can be compiled further for the real microprocessor using what is called a just-in-time (JIT) compiler.

The Java programming language supports multi-threading, and therefore Java virtual machines must incorporate multi-threading capabilities. Multi-threaded computing environments allow different parts of a program, known as threads, to execute simultaneously. In recent years, multi-threaded computing environments have become more popular because of the favorable performance characteristics provided by multithreaded applications.

Compared to the execution of processes in a multiprocessing environment, the execution of threads may be started and stopped very quickly because there is less runtime state to save and restore. The ability to quickly switch between threads can provide a relatively high level of data concurrency. In the context of a multi-threaded environment, data concurrency refers to the ability for multiple threads to concurrently access the same data. When the multi-threaded environment is a multi-processor system, each thread may be executed on a separate processor, thus allowing multiple threads to access shared data simultaneously.

Java is gaining acceptance as a language for enterprise computing. In an enterprise environment, the Java programs may run as part of a large-scale server to which many users have concurrent access. A Java virtual machine with multi-threading capabilities may spawn or destroy threads as necessary to handle the current workload. For example, a multi-threading Java virtual machine may be executing a first Java program in a first Java thread. While the first Java program is executing, the server may receive a request to execute a second Java program. Under these circumstances, the server may respond to the request by causing the Java virtual machine to spawn a second Java thread for executing the second Java program.

While the Java virtual machine is multi-threaded, the server in which the virtual machine is embedded may be executing in a single-threaded environment. Consequently, the threads used by the Java VM are "virtual", and must be executed one-at-a-time in the single "native" thread of the environment. The nature of the native thread will vary from platform to platform. For example, Windows NT has built-in support for "threads". Consequently, in a Windows NT environment the native thread may simply be an operating system thread provides by Windows NT. In a Solaris environment, on the other hand, memory may be allocated for a native thread stack, and the processor may be instructed to transfer execution into the stack thus created. The present invention is not limited to any particular environment, nor any particular native thread or stack implementation.

When a multi-threaded Java virtual machine is embedded in server running in a single threaded environment, the native thread in which the server is running is referred to as the master native thread. The Java VM initially creates a Java virtual thread that executes in the master native thread, and therefore uses the native call stack of the master native thread (the "master native stack"). The Java VM thread that executes in the master native thread is referred to herein as the master VM thread. Once the master VM thread is initiated, the Java VM may spawn additional VM threads to execute requested tasks. Each of the non-master VM threads thus spawned is associated with its own native thread, and therefore has its own native stack.

Each VM thread is capable of invoking functions in the server in which the virtual machine is embedded. For example, if the server in which the Java VM is embedded is a database server, then the Java programs that are running in the threads of the Java VM may make calls out to the database server to issue a database query, to retrieve values from memory, etc.

In addition to VM threads making calls to routines within the server, routines within the server may make calls to the Java VM. While such calls are received by the master VM thread, the operations performed by the virtual machine in response to those calls may actually be executed by VM threads other than the master VM thread. The calls made from the server routines to the virtual machine may, in fact, be made by server routines that have been invoked by call outs made by VM threads. Thus, any number of recursive calls may exist, from the VM threads out to the server, and from the server back to the VM.

Single-threaded servers that incorporate multi-threaded virtual machines raise a variety of technical challenges. For example, the server may place an error handling frame on the master native stack prior to making a call to the VM. The master VM thread may spawn another VM thread to service the call. The non-master VM thread thus spawned, which has its own non-master native thread, may call back to a particular routine within the server. If an error occurs within the routine, the exception raised by the error may trigger an error handling routine that attempts to "unwind" the stack of the non-master native thread in which the error occurred. The unwinding operation searches for the error-handling frame that was placed on the master native stack prior to the invocation of the routine that caused the exception. Unfortunately, the error-handling frame is in the master native stack, not in the non-master native stack associated with the VM thread in which the exception was raised. Consequently, an attempt to unwind the stack will unwind the entire non-master native stack of the non-master VM thread without encountering the error-handling frame.

Based on the foregoing, it is clearly desirable to provide improved techniques for handling call outs from a multi-threaded virtual machine to routines in a server running in a single-threaded environment.

SUMMARY OF THE INVENTION

Techniques are provided for making call outs from a multi-threaded virtual machine to a server running in a master native thread. When a virtual machine thread that is not running in the master native thread (a "non-master VM thread") encounters code that requires a call to be made to a server routine, the non-master VM thread transfers control to the master native thread for making the call. The master native thread is then used to make the call out to the specified server routine. If the call returns without an error, then the non-master VM thread switches back to using a non-master native thread.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus are described for making call outs from a multi-threaded virtual machine to a single-threaded environment. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques are provided for making call outs from a multi-threaded virtual machine to a single-threaded server in which the virtual machine is embedded. According to one embodiment, when a non-master VM thread encounters code that requires a call to be made to a server routine, the non-master VM thread transfers control to the master native thread for making the call. The master native thread is then used to make the call out to the specified server routine. If the call returns without an error, then the non-master VM thread switches back to using a non-master native thread.

An error-handling frame may be placed on the master native thread when the server calls the virtual machine. The master VM thread may assign the task associated with the call to a non-master VM thread. Because the non-master VM thread uses the master native thread to make call outs, an attempt to unwind the stack in response to an exception will unwind the matter native thread and therefore successfully encounter the error-handling frame.

Exemplary System

Figure 1:
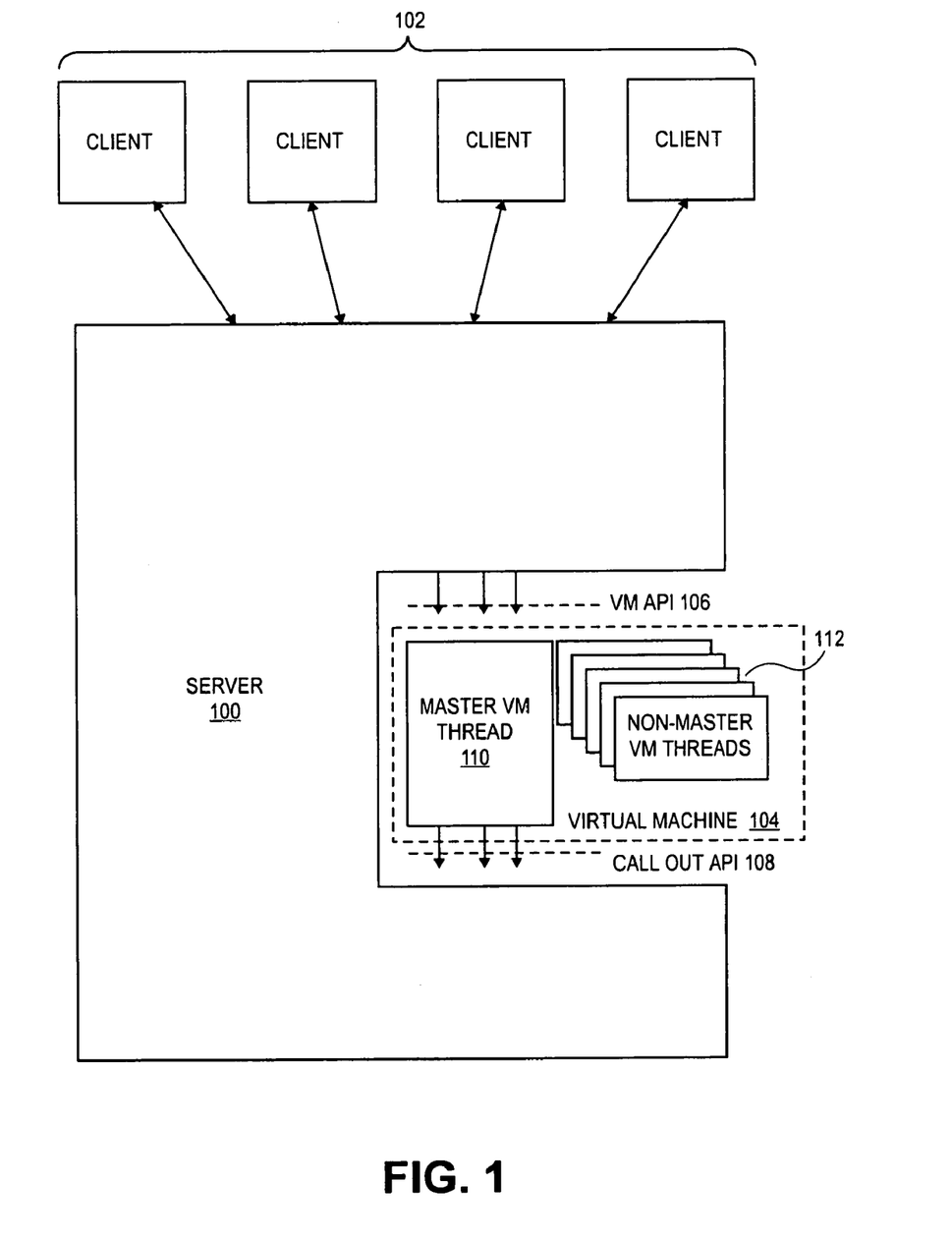
FIG. 1 is a block diagram of a server with an embedded multi-threaded virtual machine according to an embodiment of the invention.

FIG. 1 is a block diagram of server 100 configured according to an embodiment of the invention. The server 100 services the request of clients 102, and may be configured to execute the tasks specified in the requests. In the illustrated embodiment, server 100 includes a multi-threaded virtual machine 104. Multi-threaded virtual machine 104 includes routines that may be invoked by calls made by the server 100 through a VM Application Programming Interface (API) 106. Similarly, server 100 includes routines that may be invoked by calls made by virtual machine 104 through a "call out" API 108.

Multi-threaded virtual machine 104 includes a master VM thread 110 and zero or more non-master VM threads 112. Under normal operation conditions, master VM thread 110 is associated with the master native thread, and non-master VM threads 112 are associated with non-master native threads. However, as shall be explained in greater detail hereafter, for the purpose of making call outs, non-master VM threads 112 temporarily use the master native thread.

The VM threads illustrated in FIG. 1 are logical threads. That is, they do not necessarily represent threads that are executed concurrently. Rather, VM threads must be executed in native threads, and in single-threaded environments only one native thread executes at a time. In an environment in which only a single native thread can execute at a time, the multiple logical VM threads within virtual machine 104 must execute serially according to a schedule. The scheduling of the VM threads may be handled, for example, by a scheduler.

Figure 2A:
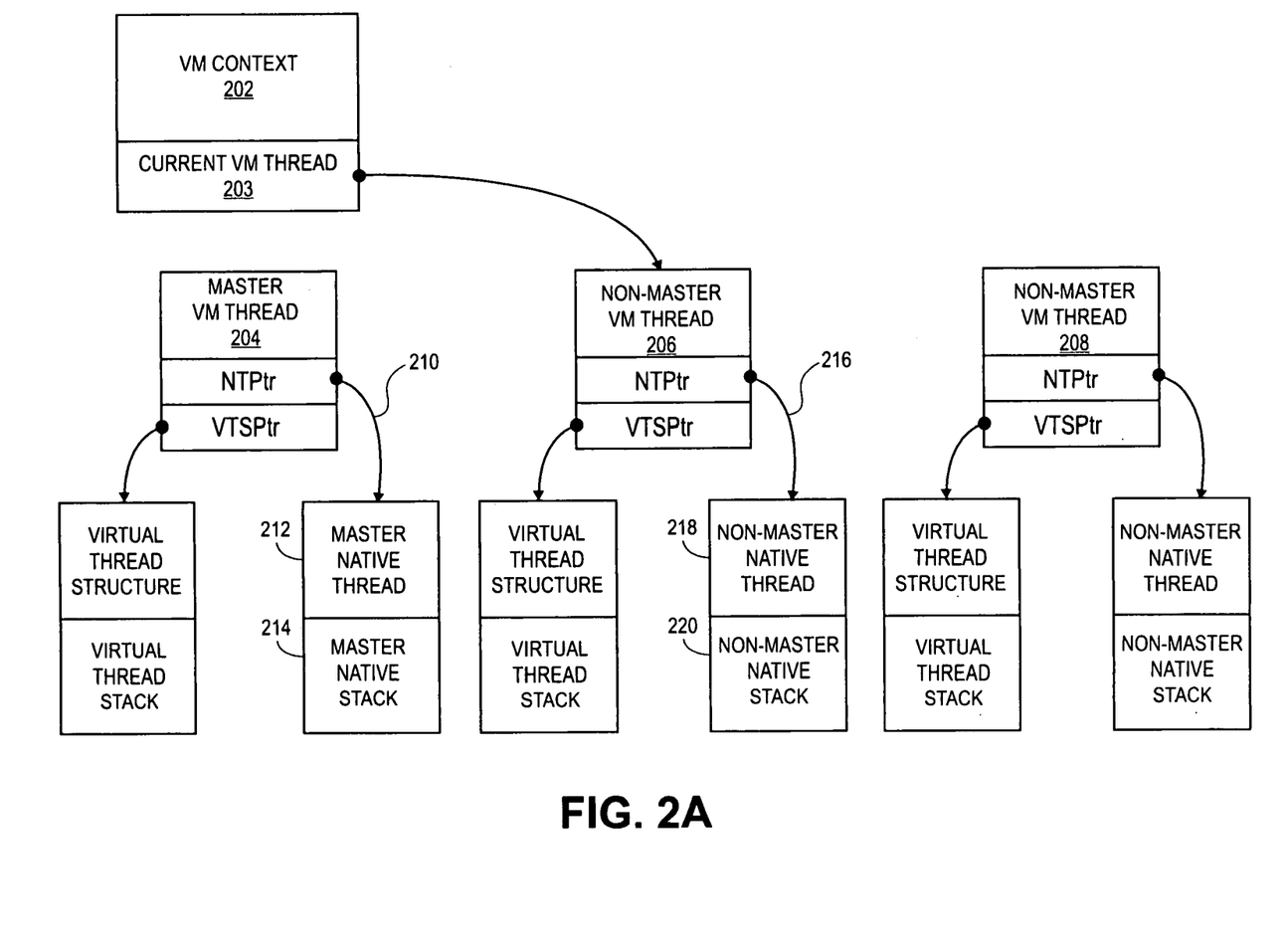
FIG. 2A is a block diagram of structures that implement a multi-threaded virtual machine according to an embodiment of the invention.

FIG. 2A illustrates structures maintained by virtual machine 104 to implement the logical VM threads according to an embodiment of the invention. Referring to FIG. 2A, the virtual machine 104 maintains a data structure, referred to herein as a "VM context" 202. The VM context 202 includes a current VM thread pointer 203 that points to the VM thread that is currently scheduled for execution (the "current" VM thread). In the illustrated embodiment, three virtual VM threads have been created (VM threads 204, 206, and 208), and thread 206 is the current VM thread.

Each VM thread maintains a native thread pointer (NTPtr) and a virtual thread structure pointer (VTSPtr). The NTPtr of a VM thread is a pointer to a native thread associated with the VM thread. A native thread is a structure that includes a native stack that is configured for use by the native thread. Specifically, the NTPtr 210 of the master VM thread 204 points to the master native thread 212 which, in turn, is associated with the master native stack 214. The NTPtr of non-master VM threads point to other native threads configured in the same manner as the master native thread, but which are typically only used during execution of the VM threads with which they are associated.

The VTSPtr of a VM thread points to a virtual thread structure that is associated with the VM thread. Each such virtual thread structure may be, for example, an instantiation of a virtual thread object. In an embodiment where virtual machine 104 is a JAVA virtual machine, the virtual thread structure to which each VTSPtr points may be, for example, an instantiation of the java.lang.thread object. The java-.lang.thread object pointed to by the VTSPtr of a VM thread is the object that is seen by Java programs that are being executed within that particular VM thread.

Thread Switching

As mentioned above, the master native thread 212 is used by all VM threads for making call outs, according to an embodiment of the invention. Preferably, the use of the master native thread 212 for call outs is performed in a manner that is largely transparent to the virtual machine 104 and the programs being executed by the virtual machine.

Relative to the virtual machine 104, when a particular VM thread makes a call out, and the call out results in a call back in to the virtual machine 104, the VM thread that handles the call in should be the same VM thread that made the call out. Relative to the programs being executed by the virtual machine, the java.lang.thread object that is visible to a particular program should not change in response to the program making a call out.

To achieve the desired transparency, the current VM thread pointer 203 does not switch from a non-master VM thread to the master VM thread 204 in response to making a call out. In addition, the NTSPtr of a non-master virtual thread that requires to make the call out is not changed in response to making a call out, and therefore remains pointing to the same java.lang.thread structure.

The thread switch is performed, therefore, by causing the NTPtr pointer that is associated with current VM thread to point to the master native thread 212 prior to making a call, and by transferring control from the non-master native thread of the non-master VM thread to the master native thread 212, as shall be described in greater detail hereafter.

Handling Outgoing Calls

According to one embodiment, call outs are handled by performing the following steps when a VM thread attempts to make a call through the call out API 108:

First, it is determined whether the VM thread making the call out is currently associated with the master native thread 212. If the VM thread making the call out is associated with the master native thread 212, then the call out is made through the call out API 108 and no further action is required.

If the VM thread making the call out is not associated with the master native thread 212, then the arguments of the call out are "packaged" into a data structure. The NTPtr pointer of the current VM thread is swapped with the NTPtr pointer of the master VM thread 204. After the swap, the NTPtr of the VM thread making the call will point to the master native thread 212, and the NTPtr of the master VM thread 204 will point to a non-master native thread.

Figure 2B:
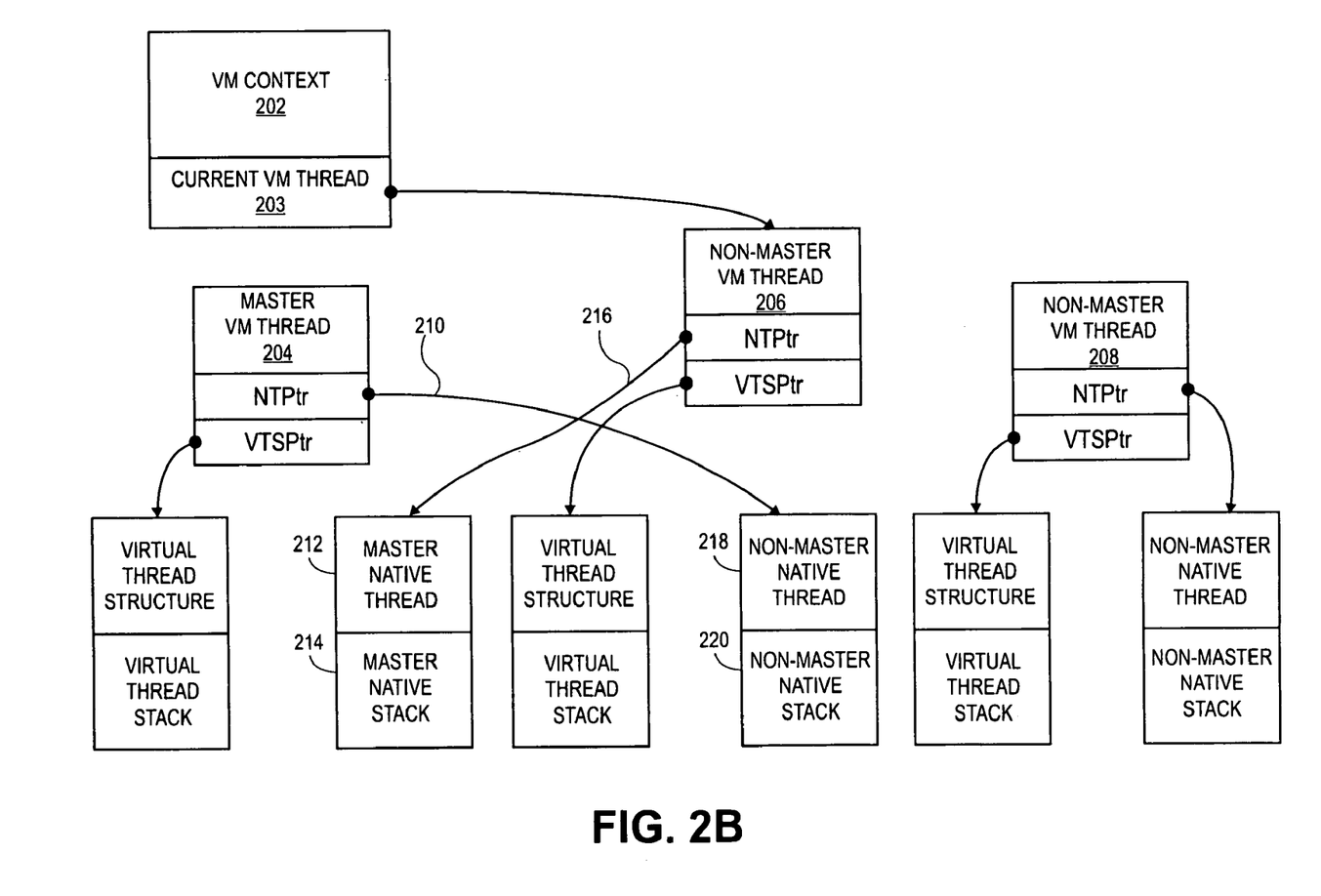
FIG. 2B is a block diagram of the structures in FIG. 2A after native thread pointers have been swapped in response to a call out.

FIG. 2B illustrates the system of FIG. 2A after the NTPtr 216 of the current VM thread 206 has been swapped with the NTPtr 210 of master VM thread 204 in response to non-master VM thread 206 attempting to make a call out. After the pointer swap, the NTPtr 216 of non-master VM thread 206 points to master native thread 212, and the NTPtr of master VM thread 204 points to non-master native thread 218.

At this point, execution control will still be using the non-master native thread 218, even though that non-master native thread 218 is no longer associated with the current VM thread 206. Therefore, control is transferred from the non-master native thread 218 to the master native thread 212 prior to making the call out. After control is transferred, the call out is made using the packaged arguments. Upon a successful return from the call, control is transferred back to the non-master native thread 218, and the NTPtr 216 of the current VM thread 206 is swapped with the NTPtr 210 of the master VM thread 204, returning the system to the state shown in FIG. 2A.

According to one embodiment, execution control is passed from the non-master native thread 218 to the master native thread 212 by assigning a "wake up action" to the master native thread 212. The wake-up action is an action to be performed by the master native thread 212 when execution of the master native thread 212 recommences. The specific wake up action assigned to the master native thread 212 is the action of making the desired call, swapping the NTPtrs, and explicitly transferring execution control back to the non-master native thread 218 when the call returns. The non-master native thread 218 then explicitly transfers execution control to the master native thread 212 by sending the appropriate message to the scheduler.

The master native thread 212 begins execution and sees that it has a pending wake up action. It performs the wake up action by making the call out. When control returns from the call out, the NTPtrs 210 and 216 are swapped back, and the master native thread 212 explicitly transfers control back to non-master native thread 218.

Call Processors

Figure 3:
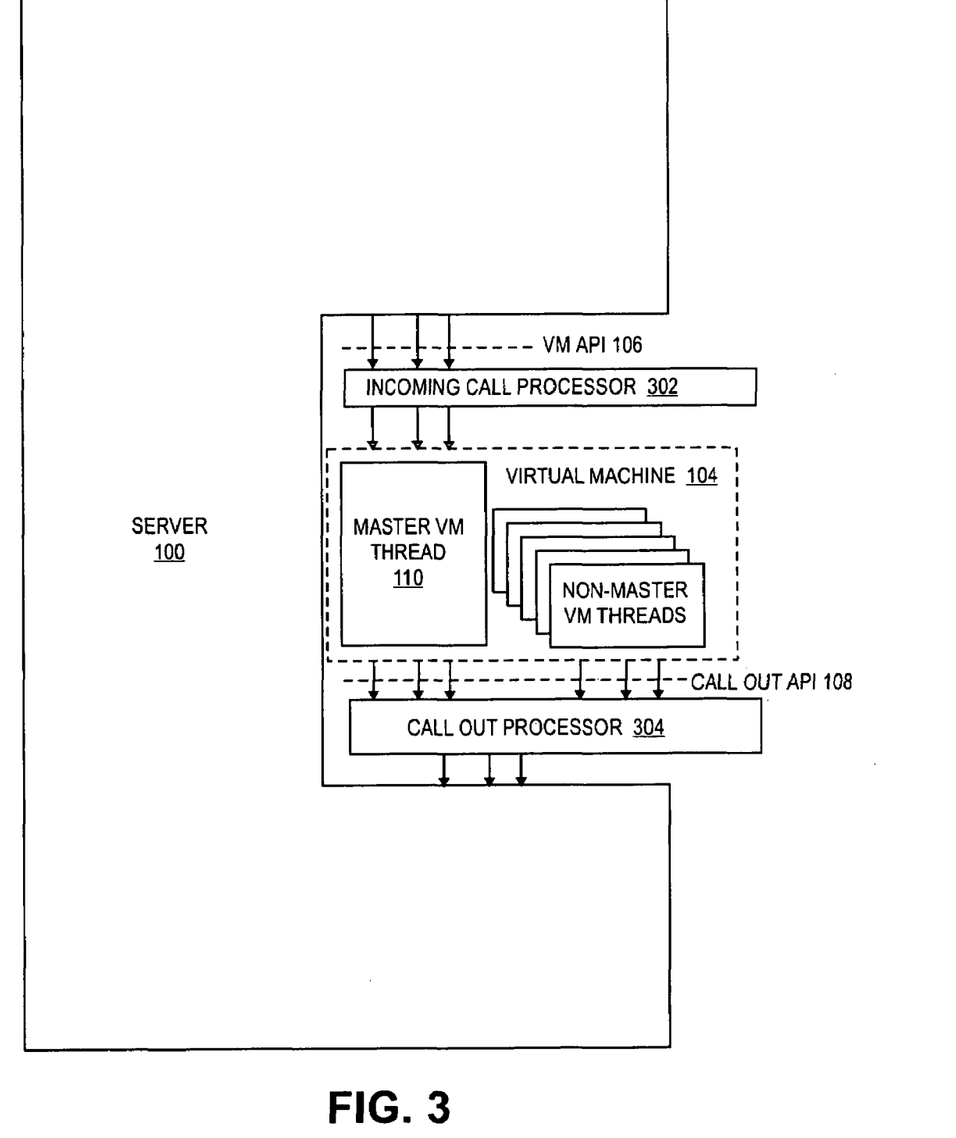
FIG. 3 is a block diagram illustrating the use of an incoming call processor and a call out processor according to an embodiment of the invention.

According to one embodiment, a call out processor is used to implement the switching technique described above. Specifically, as illustrated in FIG. 3, all calls made from virtual machine 104 through call out API 108 are intercepted by a call out processor 304. In response to receiving a call, the call out processor 304 determines whether the current VM thread is associated with the master native thread 212. If the current VM thread is associated with the master native thread 212, then the call out is performed.

If the current VM thread is not associated with the master native thread 212, then the call out processor 304 associates the current VM thread with the master native thread 212, establishes the wake up action for the master native thread 212, and causes execution control to transfer to the master native thread. The VM thread performs the wake-up action by making the call out. The call out processor 304 intercepts the call and determines whether the master native thread 212 is associated with the current VM thread that is making the call. Because the master native thread 212 has been associated with the current VM thread, the call out is performed.

According to one embodiment, an incoming call processor 302 may also be employed. The incoming call processor 302 intercepts calls to the virtual machine 104 and determines whether the routine that is being called has already been initialized. If the routine that is being called has not already been initialized, then the incoming call processor 302 makes calls to the virtual machine 104 to initialize the called routine. Once the appropriate initialization has been performed, the incoming call processor 302 issues the call to the virtual machine 104.

Call processors 302 and 304 may be implemented in a variety of ways. According to one embodiment, call processors 302 and 304 are implemented as LISP routines that dynamically generate C code that contains the logic to perform the functionality described above. For example, assume that call out processor 304 receives a call to ioct_bar( ) when the current VM thread is not associated with the master native thread 212. In response to the call, call out processor 304 generates C code that contains logic for associating the current VM thread with the master native thread 212, and for calling a corresponding server routine (e.g. ioc_bar( )) in a call that passes the same parameters as the call that was made to ioct_bar( ). The C code thus generated is then executed to cause the actions dictated by the logic to be performed.

Hardware Overview

Figure 4:
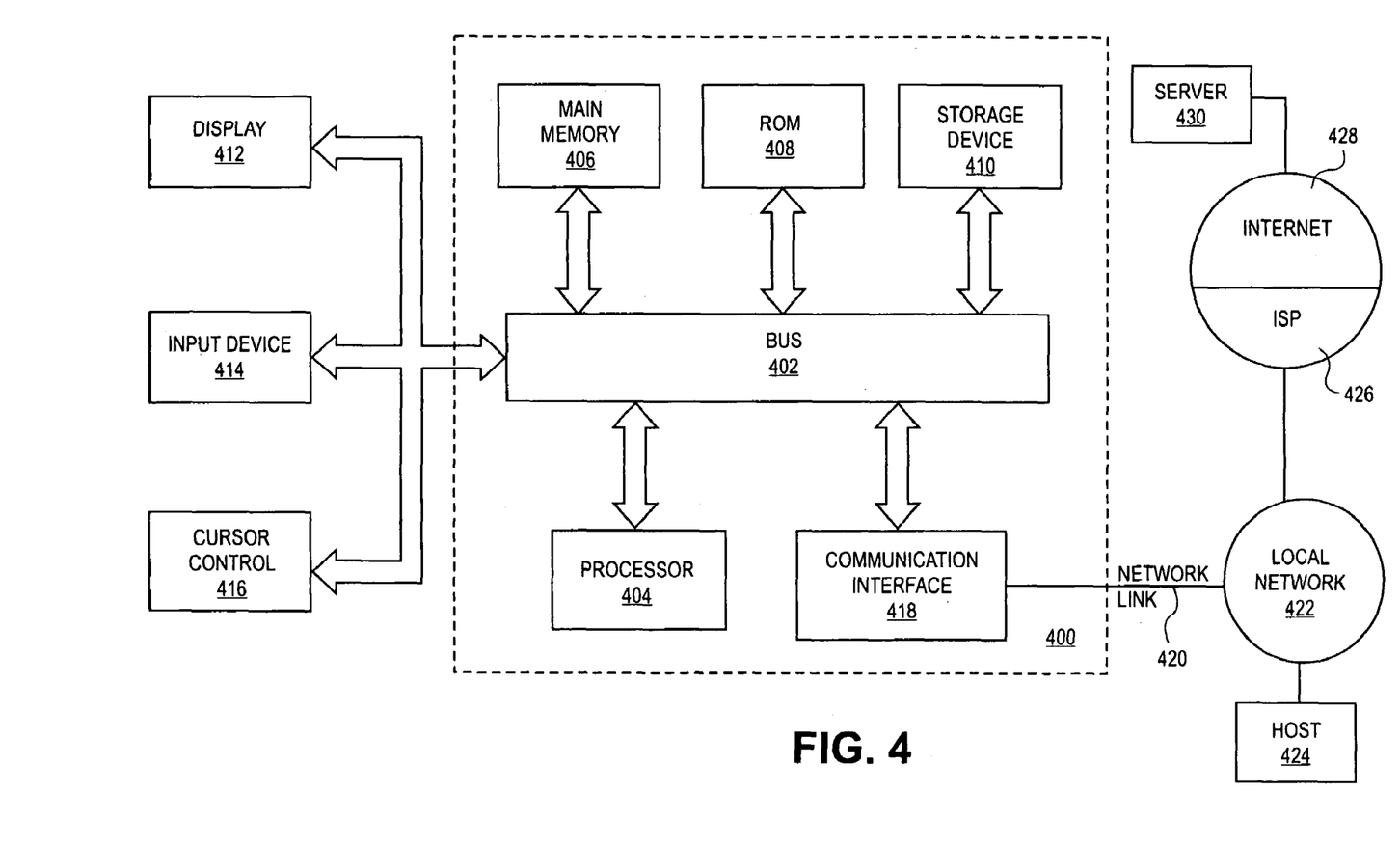
FIG. 4 is a block diagram illustrating a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other native medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for making a call out from a multi-threaded virtual machine embedded in a server that is executing in a master native thread; the method comprising the steps of:

in response to detecting a call to a routine in the server made in a current virtual-machine thread of said virtual machine, determining whether the current virtual-machine thread is associated with the master native thread, if the current virtual-machine thread is associated with the master native thread, then making the call to the routine in the server;

if the current virtual-machine thread is not associated with the master native thread, then making the call to the routine in the server after performing the steps of:

associating the current virtual-machine thread with said master native thread; and transferring execution control to said master native thread;

wherein the current virtual-machine thread is a non-master virtual-machine thread that is associated with a non-master native thread;

wherein the step of transferring execution control is performed by transferring execution control from said non-master native thread to said master native thread;

wherein the current virtual-machine thread is associated with the non-master virtual-machine thread by a first pointer; and wherein the step of associating the current virtual-machine thread with the master native thread is performed by causing the first pointer to point to the master native thread.

2. The method of claim 1, wherein:

a master virtual-machine thread is associated with the master native thread by a second pointer; and the step of associating the current virtual-machine thread with the master native thread is performed by swapping the first pointer with the second pointer.

3. The method of claim 1, further comprising the step of establishing performance of said call to the routine in the server as a wake up action for said master native thread prior to transferring execution control to said master native thread.

4. The method of claim 1, further comprising the step of returning execution control to said non-master virtual-machine thread upon return from said call to the routine in the server.

5. The method of claim 1, wherein the step of determining whether the current virtual-machine thread is associated with the master native thread is performed by a call out processor configured to generate code with logic for performing the steps of:

associating the current virtual-machine thread with said master native thread;

transferring execution control to said master native thread; and performing said call to the routine in the server.

6. A computer-readable medium bearing instructions for making a call out from a multi-threaded virtual machine embedded in a server that is executing in a master native thread, the instructions comprising instructions for performing the steps of:
- in response to detecting a call to a routine in the server made in a current virtual-machine thread of said virtual machine, determining whether the current virtual-machine thread is associated with the master native thread;
- if the current virtual-machine thread is associated with the master native thread, then making the call to the routine in the server;
- if the current virtual-machine thread is not associated with the master native thread, then making the call to the routine in the server after performing the steps of:
  - associating the current virtual-machine thread with said master native thread; and
  - transferring execution control to said master native thread;
- wherein the current virtual-machine thread is a non-master virtual-machine thread that is associated with a non-master native thread;
- wherein the step of transferring execution control is performed by transferring execution control from said non-master native thread to said master native thread;
- wherein the current virtual-machine thread is associated with the non-master virtual-machine thread by a first pointer; and
- wherein the step of associating the current virtual-machine thread with the master native thread is performed by causing the first pointer to point to the master native thread.

7. The computer-readable medium of claim 6, wherein:
- a master virtual-machine thread is associated with the master native thread by a second pointer; and
- the step of associating the current virtual-machine thread with the master native thread is performed by swapping the first pointer with the second pointer.

8. The computer-readable medium of claim 6, further comprising instructions for performing the step of establishing performance of said call to the routine in the server as a wake up action for said master native thread prior to transferring execution control to said master native thread.

9. The computer-readable medium of claim 6, further comprising instructions for performing the step of returning execution control to said non-master virtual machine thread upon return from said call to the routine in the server.

10. The computer-readable medium of claim 6, wherein the step of determining whether the current virtual-machine thread is associated with the master native thread is performed by a call out processor configured to generate code with logic for performing the steps of:
- associating the current virtual-machine thread with said master native thread;
- transferring execution control to said master native thread; and
- performing said call to the routine in the server.

11. A computer system, comprising:
- a server executing in a master native thread;
- a multi-threaded virtual machine configured to service calls from said server;
- a call out processor configured to detect call outs from said multi-threaded virtual machine to routines in said server, and to respond to said call outs by performing the steps of:
  - determining whether a current virtual-machine thread initiating a call to a routine in the server is associated with the master native thread;
  - if the current virtual-machine thread is associated with the master native thread, then making the call to the routine in the server;
  - if the current virtual-machine thread is not associated with the master native thread, then making the call to the routine in the server after performing the steps of:
    - associating the current VM thread with said master native thread; and
    - transferring execution control to said master native thread;
  - wherein the current virtual-machine thread is a non-master virtual-machine thread that is associated with a non-master native thread;
  - wherein the step of transferring execution control is performed by transferring execution control from said non-master native thread to said master native thread;
  - wherein the current virtual-machine thread is associated with the non-master virtual-machine thread by a first pointer; and
  - wherein the step of associating the current virtual-machine thread with the master native thread is performed by causing the first pointer to point to the master native thread.

* * * * *